(12) United States Patent
Noller

(10) Patent No.: US 8,832,474 B2
(45) Date of Patent: Sep. 9, 2014

(54) SLAVE CIRCUIT OF A LIN BUS AND METHOD FOR OPERATION

(75) Inventor: Armin Noller, Grossbottwar (DE)

(73) Assignee: Atmel Corporation, San Jose, CA (US)

(*) Notice: Subject to any disclaimer, the term of this patent is extended or adjusted under 35 U.S.C. 154(b) by 1352 days.

(21) Appl. No.: 12/566,418

(22) Filed: Sep. 24, 2009

(65) Prior Publication Data

US 2010/0106991 A1    Apr. 29, 2010

(30) Foreign Application Priority Data

Oct. 28, 2008  (DE) .......................... 10 2008 053 534

(51) Int. Cl.
*G06F 1/00* (2006.01)
*G06F 1/26* (2006.01)
*G06F 1/32* (2006.01)
*H04L 12/403* (2006.01)
*H04L 12/40* (2006.01)

(52) U.S. Cl.
CPC . *H04L 12/40039* (2013.01); *H04L 2012/40234* (2013.01); *Y02B 60/32* (2013.01); *H04L 2012/40273* (2013.01); *H04L 12/403* (2013.01)
USPC ............................ 713/310; 713/300; 713/320

(58) Field of Classification Search
CPC ............ H04L 12/40039; H04L 12/403; H04L 2012/40234

USPC ......................................... 713/300, 310, 320
See application file for complete search history.

(56) References Cited

U.S. PATENT DOCUMENTS

| 7,248,634 B2 * | 7/2007 | Koyasu .......................... 375/256 |
| 2005/0267659 A1 | 12/2005 | Sunaga et al. |
| 2008/0215908 A1 | 9/2008 | De Haas et al. |
| 2009/0204834 A1 * | 8/2009 | Hendin et al. ................. 713/323 |

FOREIGN PATENT DOCUMENTS

| DE | 10 2004 026 383 A1 | 12/2005 |
| DE | 10 2007 033 186 A1 | 1/2009 |

* cited by examiner

*Primary Examiner* — Mark Connolly
(74) *Attorney, Agent, or Firm* — Baker Botts LLP

(57) ABSTRACT

A slave circuit of a LIN bus and method for operating a slave circuit is provided. The slave circuit includes a receiver circuit that is connected to the bus in order to output bit sequences as a function of a bus voltage, an interface circuit for controlling a sleep mode and a normal mode, a detector circuit for evaluating the bus voltage which is connected to the bus, a timer device that is connected to an output of the detector circuit and to the interface circuit. Whereby, the detector circuit, the timer device, and the interface circuit are designed to detect an exceedance of a time threshold by a waveform of the bus voltage of the bus, and to continue a sleep mode in the event of an exceedance, wherein the time threshold is greater than the duration of a wake-up command.

16 Claims, 2 Drawing Sheets

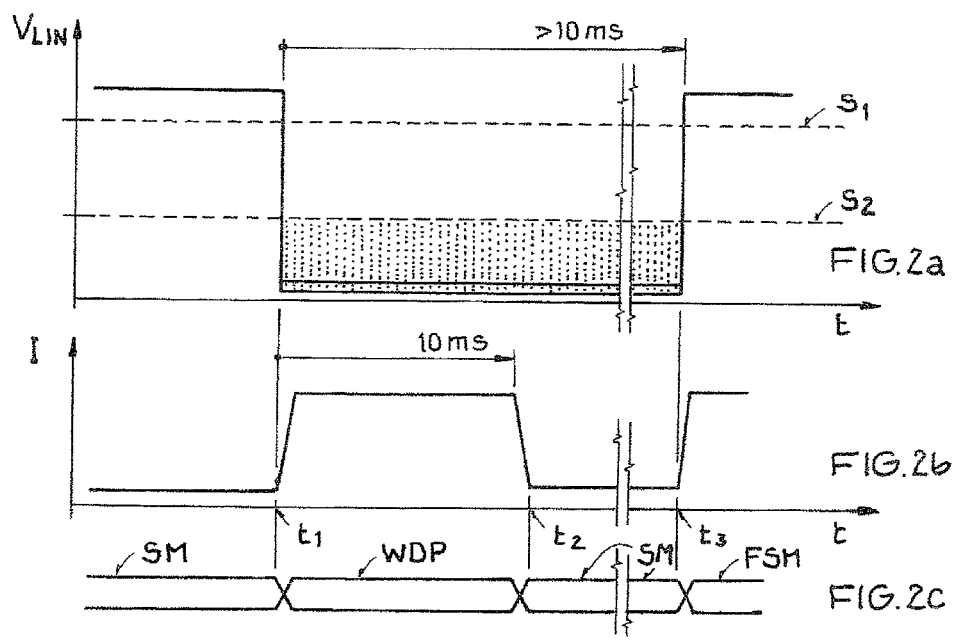
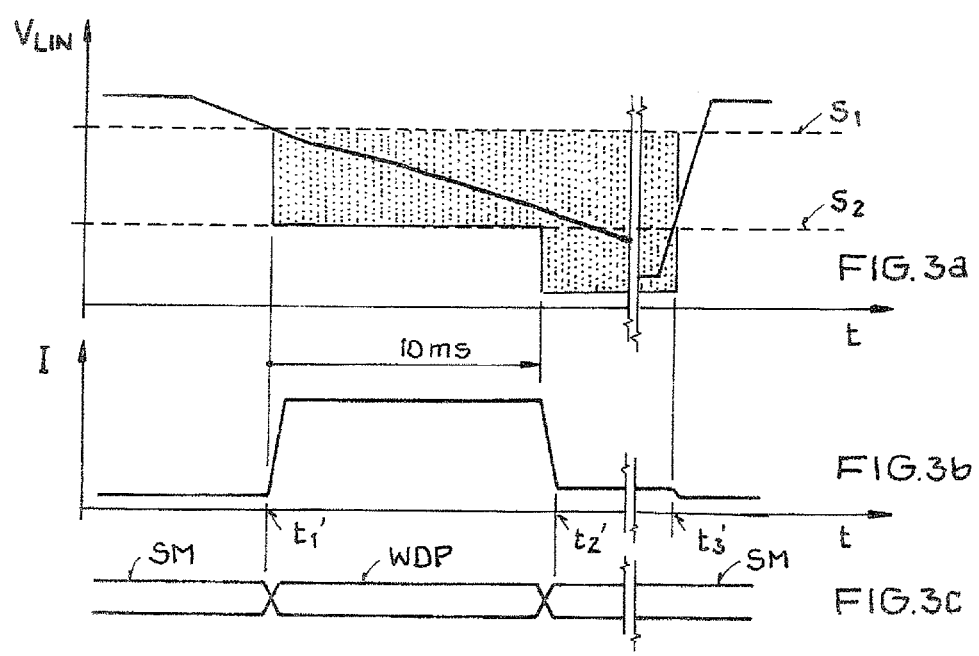

SLAVE CIRCUIT OF A LIN BUS AND METHOD FOR OPERATION

This nonprovisional application claims priority to German Patent Application No. 10 2008 053 534.6, which was filed in Germany on Oct. 28, 2008, and which is herein incorporated by reference.

BACKGROUND OF THE INVENTION

1. Field of the Invention

The present invention relates to a slave circuit of a LIN bus and a method for operation.

2. Description of the Background Art

A LIN bus (LIN=Local Interconnect Network) is a type of fieldbus. The LIN bus was developed for the communication of intelligent sensors and actuators in motor vehicles. Typical application examples include networking within a door or a seat. A LIN is composed of a LIN master and one or more LIN slaves. The LIN master has knowledge about the time sequence of all data to be transmitted. This data is transmitted by the appropriate LIN slaves when they are requested to do so by the LIN master. The request takes place through the transmission of a header that is characterized by a specific message address. In this context, the header is transmitted by the master. The slave then places the data bytes on the bus after the header.

A LIN transceiver provides the physical bus coupling. A level below 40% of the supply voltage is interpreted by the receiver as a logic zero. Receivers interpret levels greater than 60% of the supply voltage as logic one. In terms of circuitry, a LIN cluster corresponds to an open-collector circuit. A pull-up resistor ensures that the bus level is close to the supply voltage (high level) when the transmitting transistors of all LIN nodes are off. The bus level is pulled close to ground (low level) as soon as a transmitting transistor is on. Accordingly, the low state is called the dominant level, and the high state is called the recessive level.

The LIN specification has two network node states: sleep mode and normal mode. The transition between the two modes is initiated either by an explicit command from the LIN master or via a wake-up signal frame from the LIN master or one of the LIN slaves.

SUMMARY OF THE INVENTION

It is therefore an object of the present invention to improve a slave circuit of a LIN bus to the greatest extent possible. Accordingly, a slave circuit of a LIN bus is provided. The slave circuit can be designed as a transceiver to receive and transmit information over the LIN bus.

The slave circuit can have a receiver circuit that is connectable to the bus, in particular through a filter. The receiver circuit is designed to output bit sequences as a function of a bus voltage on the bus. The slave circuit can have an interface circuit, which is designed to control a sleep mode and a normal mode. The interface circuit can be connected to an output of the receiver circuit.

The slave circuit can have a detector circuit for evaluating the bus voltage. The detector circuit can be connected to the bus, for example, through the filter.

The slave circuit can have a timer device that is connected to the output of the detector circuit and to the interface circuit. The timer device can have a counter to count time units in order to determine processes in time.

The timer device and the interface circuit can be designed to detect when a time threshold by a waveform of a bus voltage of the bus is exceeded. The time behavior of the bus voltage can therefore be evaluated by comparators. The detector circuit, the timer device, and the interface circuit can be designed to continue a sleep mode in the event that the time threshold is exceeded. The time threshold here is greater than the duration of a wake-up command. The duration of the wake-up command is defined as a 5-millisecond dominant level (low level) as a function of the LIN specification. The time threshold is advantageously greater than 6 milliseconds, preferably 10 milliseconds. For example, a dominant level of 10 milliseconds or longer then results in an exceedance of the time threshold. Consequently, no valid wake-up command is detected, and the sleep mode is continued.

The invention has the additional object of specifying a method for operating a slave circuit on a LIN bus that is improved to the greatest degree possible. Accordingly, a method for operating a slave circuit on a LIN bus is provided.

A bus voltage on the LIN bus is monitored by the slave circuit. The monitoring can take place on a continuous-time basis in that the bus voltage is measured continuously by the slave circuit, for example by comparators.

The slave circuit detects when the bus voltage falls below a first threshold value. The bus voltage is advantageously compared with the first threshold value by means of a comparator. A wake-up detection phase for the detection of valid commands to wake up the slave circuit is started as a function of the determination that the value has fallen below the threshold. Such commands can be generated by a master circuit or another slave circuit of the LIN bus, for example.

A time duration of the bus voltage falling below at least one second threshold value is evaluated by the slave circuit in the wake-up detection phase. Time units for determining the time duration are advantageously counted by the slave circuit starting when the value falls below the second threshold, with the counter advantageously being stopped when the value exceeds the first and/or second threshold.

The slave circuit is awakened from a sleep mode into a normal mode when the time duration of the drop below the second threshold during the wake-up detection phase is associated with a wake-up command. For example, if the time duration of the drop below the threshold is less than ten milliseconds, this time duration is associated with a valid wake-up command and the slave circuit is then preferably initialized.

In contrast, the sleep mode of the slave circuit is continued if the time duration of the drop below the second threshold during the wake-up detection phase is not associated with the wake-up command. For example, the time duration of the drop below the threshold is longer than ten milliseconds, so that the drop below the threshold is not equivalent to a valid wake-up command.

The improvements described below relate both to the slave circuit and to the method for operating a slave circuit. Features of the method are evident here from functions of the circuit. Functions of the circuit are evident from features of the method.

According to an embodiment, the slave circuit can have an additional timer device. The additional timer device is connectable to the output of the receiver circuit and to the interface circuit.

According to an embodiment, the second threshold value can be lower than the first threshold value. Accordingly, the bus voltage with a falling voltage first drops below the first threshold value and then drops below the second threshold value as the voltage continues to fall.

In an embodiment, provision is made that the detector circuit has a first, for example, analog comparator for comparing the bus voltage with a second threshold value.

According to an embodiment, the receiver circuit can have a second comparator. The second comparator can be designed as a window comparator. The second comparator can have at least one second threshold value. For example, the two second threshold values of 40% and 60% constitute the window of the window comparator.

The receiver circuit, the interface circuit, and the additional timer device can be designed to determine the wake-up command by comparing the time behavior of the bus voltage of the bus to a minimum time duration. In advantageous fashion, the interface circuit and/or the additional timer device are designed to control the normal mode in the event a wake-up command is determined.

According to an embodiment, the slave circuit can be designed to compare the time duration of the drop below the second threshold value to a time threshold for the purpose of evaluation. It is advantageous for the time threshold to be 10 milliseconds.

The slave circuit can be awakened from the sleep mode into the normal mode when the time duration of the drop below the second threshold is less than the time threshold. In contrast, the sleep mode of the slave circuit is preferably continued if the time duration of the drop below the second threshold is greater than the time threshold.

According to an embodiment, a time duration is measured during the wake-up detection phase, triggered by the drop below the first threshold value. For this purpose, a timer is advantageously started when the value drops below the first threshold value.

At the end of the time duration, the slave circuit detects whether the bus voltage has fallen below the second threshold value, or has failed to fall below it. A piece of information associated with the drop below, or the failure to drop below, the second threshold value is preferably stored in the slave circuit in a nonvolatile manner.

A mode of the slave circuit is controllable as a function of the stored information. The control takes place when the bus voltage again exceeds the first threshold value and/or the second threshold value after having fallen therebelow.

In an embodiment, the sleep mode is continued by the controller when the stored information corresponds to the bus voltage failing to drop below the second threshold value. In contrast, the controller advantageously initiates a safe mode when the stored information corresponds to the bus voltage dropping below the second threshold value. In the safe mode, the interface circuit is active. In contrast, a processing unit—for example a microcontroller—connected to the interface circuit is initially still deactivated. The interface circuit subsequently wakes up the processing unit. The processing unit signals the normal mode (active mode) with an enable signal to the interface circuit. The safe mode is also initiated when the supply voltage is turned on.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2a, 2b and 2c illustrate schematic diagrams; and

FIGS. 3a, 3b and 3c illustrate schematic diagrams.

DETAILED DESCRIPTION

Figure 1:
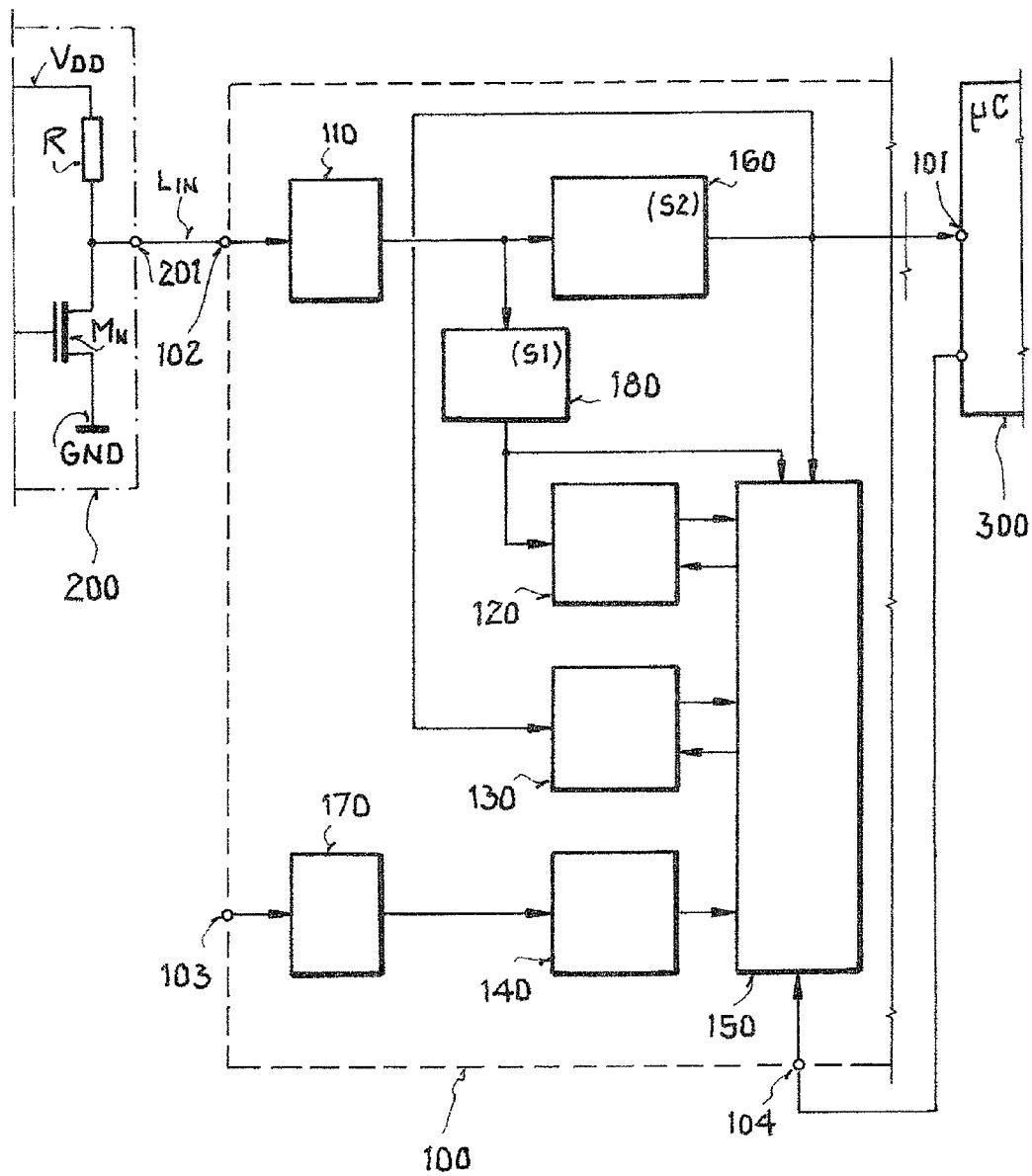
FIG. 1 is a block diagram with a slave circuit of a LIN.

Shown in FIG. 1 is a block diagram with a slave circuit 100 (slave) and a master circuit 200 on a LIN bus LIN. The master circuit 200 (master) is connected to the LIN bus LIN. The LIN bus LIN is connected to the supply voltage VDD, for example through a resistor R (pull-up) connected to an output 201 of the master circuit. The LIN bus LIN has a recessive level (high state) when the transistor MN is off. If the transistor MN is in a conducting state, it connects the LIN bus LIN to ground GND, so that the LIN bus LIN has a dominant level (low state). If the master circuit 200 is disconnected from the supply voltage VDD, a bus voltage on the LIN bus LIN drops. Communication through the LIN bus LIN is no longer possible after disconnection of the master circuit 200 from the supply voltage VDD. If the slave circuit 100 is not simultaneously disconnected from the supply voltage, it advantageously detects from the waveform of the bus voltage that a valid bus signal is not present.

The slave circuit 100 is connectable to the LIN bus LIN by the terminal 102. The slave circuit 100 has a receiver circuit 160, which is connected to the LIN bus LIN through a filter 110. The filter 110 is an analog low-pass filter for filtering out high-frequency interference signals. The slave circuit 100 has a detector circuit 180 connected to the LIN bus LIN through the filter 110, which detector circuit has a comparator with a first threshold value (S1). The receiver circuit 160 has a window comparator with two second threshold values to constitute the comparator window. The first of the two second threshold values is defined as 60% of the supply voltage (VDD), so that an exceedance is interpreted as logic 1. The second (S2) of the two second threshold values is defined as 40% of the supply voltage (VDD), so that a drop below this threshold is interpreted as logic 0. The output of the receiver circuit 160 can be connected to a processing unit 300, for example a microcontroller, for the purpose of output.

The output of the detector circuit 180 is connected to a control input of a first timer device 120. In addition, the detector circuit 180 is connected to the interface circuit 150. An additional, second timer device 130 is connected to the output of the receiver circuit 160.

The second timer device 130 determines, together with the receiver circuit 160, a time duration during which the bus voltage of the LIN bus LIN has a dominant level. If a counter of the second timer device 130 runs out, which device reaches a minimum time duration of a dominant level defined for a wake-up command, a signal associated with expiration of the counter arrives at the interface circuit 150 through a connection. By means of the connection between the interface circuit 150 and the second timer device 130, it is possible to reset, stop, or start the counter, for example.

The detector circuit 180 is designed to determine that the bus voltage has dropped below the first threshold value (S1). If the detector circuit 180 determines by means of a comparator that such a drop has taken place, then a detection signal arrives at the interface circuit 150 to start a safe mode. At the same time, a counter of the first timer device is started by means of the detection signal. As the bus voltage continues to fall, the counter of the second timer device 130 is also started upon reaching 40% of the supply voltage VDD.

If the bus voltage remains below the first threshold value (S1), the counter of the first timer device 120 expires. In contrast, if the bus voltage rises above the first threshold value (S1) before expiration of the counter of the first timer device 120, then safe mode is started.

When the counter of the first timer device 120 expires, the interface circuit 150 stores the information as to whether or not the voltage has fallen below the second threshold value (S2) at the point in time when the counter of the first timer device 120 expires. To this end, an output signal of the receiver circuit 160 arrives at the interface circuit 150.

With the aid of the interface circuit 150, the first timer device 120 identifies when the permissible length of a wake-up command (wake-up signal) has been exceeded on the LIN bus LIN, and reports this exceedance back to the interface circuit 150 as a counter expiration. The interface circuit and power controller 150 stores the current output value of the receiver circuit 160 in a nonvolatile memory and ensures that the internal supply voltages of the slave circuit 100 are switched off to reduce power consumption. Accordingly, the interface circuit 150 controls the power consumption of the slave circuit 100.

A third timer device 140 is connected to the interface circuit 150. The third timer device 140 is provided for an external signal at the signal input 103, filtered by an additional filter 170—for example, an analog bandpass filter. The external signal at the signal input 103 is likewise used for wake-up by means of the interface circuit 150.

A control input 104 of the interface circuit 150 is connected to a processing unit 300. Using the control input 104, the processing unit 300 signals the interface circuit 150 by means of an enable signal that a transition from safe mode to normal mode (active mode) is taking place. The slave circuit 100 with the processing unit 300 is now fully awakened.

FIGS. 2a to 3c show several diagrams explaining the invention with exemplary waveforms of the bus voltage $U_{LIN}$. The example embodiments shown in FIGS. 2a to 3c are based on a LIN bus architecture in which a master circuit 200 can be powered off while at the same time at least one slave circuit 100 is still supplied with the supply voltage VDD. As in the example embodiment in FIG. 1, however, the powering down of the master circuit 200 also means the loss of the so-called pull-up that holds the line LIN in the recessive state as long as no activity takes place on the LIN bus.

The result is that the voltage on the LIN bus slowly drops, wherein the example embodiment in FIG. 1 has the advantage that this drop is not interpreted as a wake-up command by the slave unit 100. This achieves the effect that the average current consumption of the slave unit 100 is reduced, since no circuits that monitor the activity on the LIN bus need be put into operation. In this way the further effect is achieved that a motor vehicle battery is discharged less.

A wake-up command according to the LIN specification has a defined maximum length of 5 milliseconds. According to the example embodiments in FIGS. 2a to 3c, this period plus a certain time safety window (for example, a total of 10 milliseconds) is waited, then the slave circuit 100 is placed completely back in the sleep mode SM until the bus state is "recessive" again.

To this end, a counter is used, which is started as soon as the slave circuit 100 is in a wake-up detection phase WDP. At the point in time t1, the slave circuit 100 detects a drop by the bus voltage $U_{LIN}$ below a threshold value S1, and the wake-up detection phase WDP is started. The wake-up detection phase WDP directly follows a sleep mode SM. The counter defines a time duration starting at t1 lasting until time t2. After expiration of the time duration defined by the counter, a check is made as to whether the LIN bus LIN is already in the dominant state—which is to say below a second threshold value S2—or not. The result is stored in a nonvolatile memory.

In the embodiment from FIGS. 2a, 2b, and 2c, the bus voltage $U_{LIN}$ quickly drops below another, second threshold value S2 in the form of a steep falling edge, so that the dominant state has already been achieved by the point in time t2. After the time t2, the sleep mode SM is continued.

Similar also applies for the exemplary embodiment in FIGS. 3a, 3b, and 3c. In this exemplary embodiment the bus voltage $U_{LIN}$ falls slowly, so that the bus voltage $U_{LIN}$ has not yet fallen below the second threshold value S2 after the start of the wake-up detection phase WDP at the time t1', or even after counting to the time t2'. The failure to fall below the second threshold value S2 is stored accordingly as information about the point in time t2'. During the wake-up detection phase WDP, the current consumption I of the slave circuit 100 rises significantly, as shown schematically in FIGS. 2b and 3b, while the current consumption I is reduced from the time t2 or t2' until the time t3 or t3' in the sleep mode SM. The sleep mode SM of the slave circuit 100 is continued if the time duration of the drop below the second threshold value S2 during the wake-up detection phase is not associated with the wake-up detection phase WDP. This is the case in both exemplary embodiments in FIGS. 2a, 2b, 2c and 3a, 3b, 3c.

The result of whether the bus voltage $U_{LIN}$ has fallen below the additional, second threshold value S2 at the point in time t2 or t2' after the expiration of the time duration (t1 to t2, or t1' to t2') is stored in a memory which does not lose its memory contents even in the sleep mode SM. Only after this has been accomplished is the sleep mode SM reestablished in which current consumption is minimal.

The sleep mode SM can only be terminated again after a rising edge of the bus voltage $U_{LIN}$ at the point in time t3 or t3', which is to say when the bus voltage $U_{LIN}$ again rises to the level of the supply voltage VDD. In the concrete application case in a motor vehicle, this takes place when the ignition is turned on again, and hence the pull-up is again present in the LIN network.

As a function of the stored result regarding a drop below the second threshold value S2 or a failure to drop below it at the point in time t2 or t2', the slave circuit 100 in the exemplary embodiment in FIG. 2c is now activated and placed in a safe mode, the so-called fail-safe mode FSM, if the dominant threshold S2 has been achieved at the point in time t2.

In the exemplary embodiment in FIGS. 3a, 3b, and 3c, the awakening is first made possible by means of a repeated voltage drop on the LIN bus LIN, since the dominant threshold S2 had not (yet) been reached by the bus voltage $U_{LIN}$ after expiration of the counter of the first timer device 120 at the point in time t2'.

For the awakening, the bus voltage drops below the second threshold value S2 for a specified length of time (not shown) for the wake-up command. When this occurs, the slave circuit 100 is awakened from a sleep mode SM to a normal mode if the time duration of the drop below the second threshold value S2 is associated with a wake-up command during the wake-up detection phase (not shown).

The invention is not restricted to the variant embodiments shown in FIGS. 1 through 3c. For example, it is possible to use alternative time thresholds or additional time thresholds.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:
monitoring a bus voltage on a Local Interconnect Network (LIN) bus by a slave circuit;
detecting by the slave circuit when the bus voltage falls below a first threshold value and a wake-up detection phase is thereby started;
evaluating a time duration of a drop of the bus voltage falling below a second threshold value by the slave circuit in the wake-up detection phase;
awakening the slave circuit from a sleep mode into a normal mode when the time duration of the drop below the second threshold during the wake-up detection phase is associated with a wake-up command; and
continuing the sleep mode of the slave circuit if the time duration of the drop below the second threshold value during the wake-up detection phase is not associated with the wake-up command.

2. The method according to claim 1, wherein the time duration of the drop below the second threshold value is compared to a time threshold for the purpose of evaluation, wherein the slave circuit is awakened from the sleep mode into the normal mode when the time duration of the drop below the second threshold value is less than the time threshold, and wherein the sleep mode of the slave circuit is continued if the time duration of the drop below the second threshold value is greater than the time threshold.

3. The method according to claim 1, wherein the second threshold value is below the first threshold value.

4. The method according to claim 1, wherein during the wake-up detection phase, a time duration is measured upon a drop below the first threshold value, wherein at the end of the time duration, the slave circuit detects whether the bus voltage has fallen below the second threshold value or has failed to fall below the second threshold value, and wherein information associated with the drop below or the failure to drop below the second threshold value is stored in the slave circuit.

5. The method according to claim 4, wherein a mode of the slave circuit is controlled as a function of the stored information when one or more of the following is true:
the bus voltage again exceeds the first threshold value after having fallen below the first threshold value; and
the bus voltage again exceeds the second threshold value after having fallen the second threshold value.

6. The method according to claim 5, wherein the sleep mode is continued by a controller when the stored information corresponds to the bus voltage failing to drop below the second threshold value.

7. The method according to claim 5, wherein a controller initiates a safe mode when the stored information corresponds to the bus voltage dropping below the second threshold value.

8. A slave circuit comprising:
a receiver circuit connectable to a Local Interconnect Network (LIN) bus and being configured to output bit sequences as a function of a bus voltage, wherein the receiver circuit has a first comparator with at least one first threshold value;
an interface circuit configured to control a sleep mode and a normal mode;
a detector circuit configured to evaluate the bus voltage, which is connectable to the bus, wherein the detector circuit has a second comparator for a comparison of the bus voltage with a second threshold value; and
a timer device connectable to an output of the detector circuit and to the interface circuit;
wherein the detector circuit, the timer device, and the interface circuit are configured to detect an exceedance of a time threshold by a waveform of the bus voltage of the bus and is configured to continue a sleep mode in the event of an exceedance, and
wherein the time threshold is greater than the duration of a wake-up command.

9. The slave circuit according to claim 8, wherein an additional timer device is connectable to the output of the receiver circuit and to the interface circuit, and wherein the receiver circuit, the interface circuit, and the additional timer device are configured to determine the wake-up command by comparing the waveform of the bus voltage of the bus to a minimum time duration, and to control the normal mode in the event a wake-up command is determined.

10. An apparatus, comprising:
a memory; and
circuitry of a slave circuit operable to perform operations comprising:
monitoring a bus voltage on a Local Interconnect Network (LIN) bus;
detecting when the bus voltage falls below a first threshold value and a wake-up detection phase is thereby started;
evaluating a time duration of a drop of the bus voltage falling below a second threshold value in the wake-up detection phase;
awakening the slave circuit from a sleep mode into a normal mode when the time duration of the drop below the second threshold during the wake-up detection phase is associated with a wake-up command; and
continuing the sleep mode of the slave circuit if the time duration of the drop below the second threshold value during the wake-up detection phase is not associated with the wake-up command.

11. The apparatus according to claim 10, wherein:
the circuitry is operable to compare the time duration of the drop below the second threshold value to a time threshold for the purpose of evaluation;
the slave circuit is awakened from the sleep mode into the normal mode when the time duration of the drop below the second threshold value is less than the time threshold; and
the sleep mode of the slave circuit is continued if the time duration of the drop below the second threshold value is greater than the time threshold.

12. The apparatus according to claim 10, wherein the second threshold value is below the first threshold value.

13. The apparatus according to claim 10, wherein the circuitry is operable to:
during the wake-up detection phase, measure a time duration upon a drop below the first threshold value;
detect, at the end of the time duration, whether the bus voltage has fallen below the second threshold value or has failed to fall below the second threshold value; and
store, in the memory, information associated with the drop below or the failure to drop below the second threshold value.

14. The apparatus according to claim 13, wherein a mode of the slave circuit is controlled as a function of the stored information when one or more of the following is true:
the bus voltage again exceeds the first threshold value after having fallen below the first threshold value; and
the bus voltage again exceeds the second threshold value after having fallen the second threshold value.

15. The apparatus according to claim 14, wherein the circuitry is operable to continue the sleep mode when the stored information corresponds to the bus voltage failing to drop below the second threshold value.

16. The apparatus according to claim 14, wherein the circuitry is operable to initiate a safe mode when the stored information corresponds to the bus voltage dropping below the second threshold value.

* * * * *